(12) United States Patent
Hirokubo

(10) Patent No.: US 9,992,383 B2
(45) Date of Patent: Jun. 5, 2018

(54) COLOR MEASUREMENT APPARATUS AND PRINTING APPARATUS

(71) Applicant: Seiko Epson Corporation, Tokyo (JP)

(72) Inventor: Nozomu Hirokubo, Matsumoto (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 14/974,503

(22) Filed: Dec. 18, 2015

(65) Prior Publication Data
US 2016/0182765 A1 Jun. 23, 2016

(30) Foreign Application Priority Data
Dec. 22, 2014 (JP) ................. 2014-258513

(51) Int. Cl.
| | | |
|---|---|---|
| *G06F 15/00* | (2006.01) | |
| *G06K 1/00* | (2006.01) | |
| *H04N 1/60* | (2006.01) | |

(52) U.S. Cl.
CPC ........... *H04N 1/6044* (2013.01); *H04N 1/605* (2013.01)

(58) Field of Classification Search
CPC ..... H04N 1/6033; H04N 1/6044; H04N 1/605
USPC .................. 358/1.9, 518, 502, 513
See application file for complete search history.

(56) References Cited

U.S. PATENT DOCUMENTS

| | | | | |
|---|---|---|---|---|
| 2006/0170991 | A1* | 8/2006 | Jacob ................... | H04N 1/6033 358/504 |
| 2007/0097390 | A1* | 5/2007 | Huang ................... | H04N 1/603 358/1.9 |
| 2007/0291291 | A1* | 12/2007 | Vilar ..................... | H04N 1/3878 358/1.9 |
| 2010/0092083 | A1* | 4/2010 | Herloski ................... | G01J 3/02 382/168 |
| 2013/0329236 | A1* | 12/2013 | Hattenberger ....... | G06K 15/027 358/1.9 |
| 2014/0218802 | A1 | 8/2014 | Saito et al. | |

FOREIGN PATENT DOCUMENTS

| | | |
|---|---|---|
| JP | 2010-201845 A | 9/2010 |
| JP | 2014-153386 A | 8/2014 |

\* cited by examiner

*Primary Examiner* — Quang N Vo
(74) *Attorney, Agent, or Firm* — Harness, Dickey & Pierce, P.L.C.

(57) ABSTRACT

A color measurement apparatus includes a color measurement portion, a carriage, and a movement mechanism the color measurement portion starts color measurement after a predetermined initialization process, a moving section between patches from a point P1 to a point P3 overlaps an initialization section where the spot moves at the time of performing the initialization process, and the moving section between the patches is a section between a forward point having a distance as a radius of the spot with respect to the X direction and a backward point having a distance as a radius of the spot with respect to the X direction, based on a boundary of the patches.

6 Claims, 7 Drawing Sheets

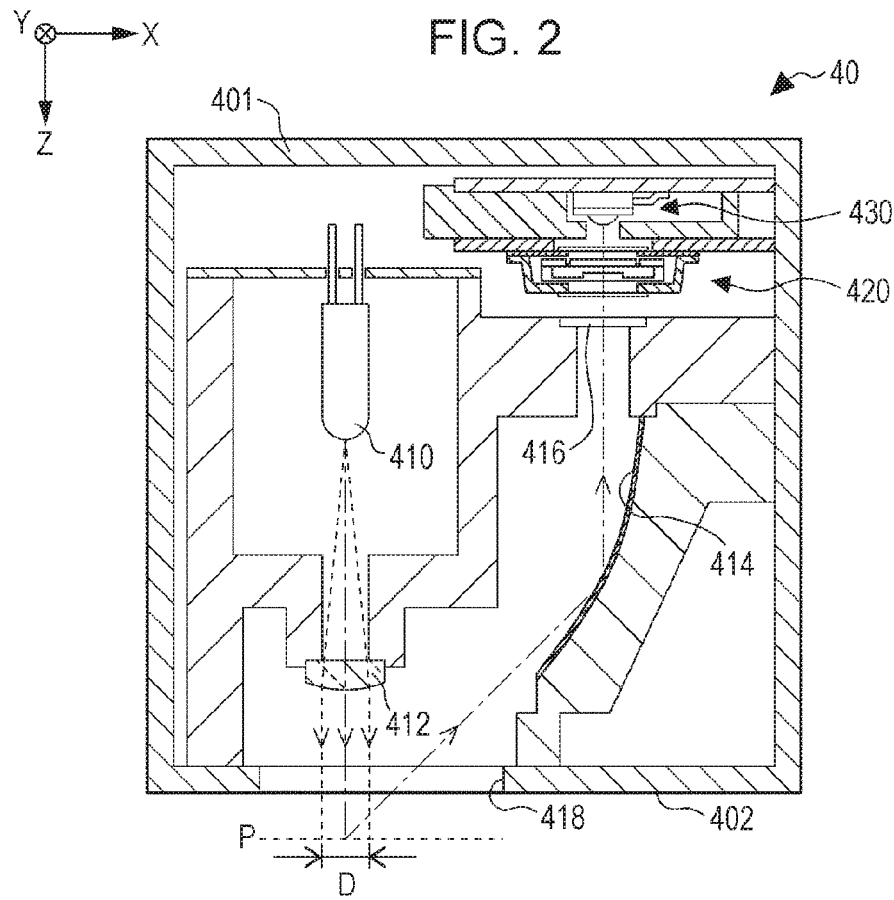
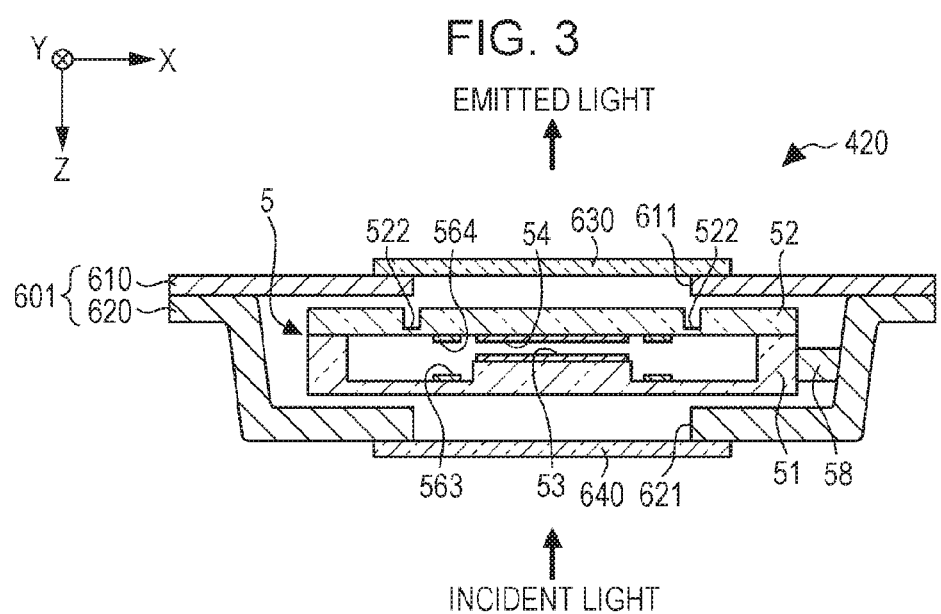

COLOR MEASUREMENT APPARATUS AND PRINTING APPARATUS

BACKGROUND

1. Technical Field

The present invention relates to a color measurement apparatus and a printing apparatus.

2. Related Art

A technology is known in which a printing apparatus prints a color chart as an aggregation of multiple patches and measures a color of each of the patches in the color chart using a color measurement portion. In this technology, there is a case in which a size of the patch in the color chart affects a result of the measured color. For example, in a case in which the size of patch is small, it is not easy to purely obtain only the color of the patch as a target to be measured. On the other hand, in a case in which the size of the patch is large, printing of the color chart takes a long time, and loss of ink or paper is also increased.

Here, a technology is known in which printing is performed many times by changing a size of a target patch, a color of the printed patch is measured, and the smallest (optimum) size of the target patch is determined based on an obtained value of the measured color, or the like (refer to JP-A-2010-201845).

However, a color measurement portion emits a spot of the light having a certain size, and measures a color of the patch using the reflected light of the spot. As the color measurement portion, there is a type of the color measurement portion which needs a predetermined initialization process before measuring the color of one of the patches.

As seen from the above, when the spot having a certain size is positioned at a boundary of the adjacent patches, the reflected light of the spot includes other colors other than a color of the patch to be a target, whereby the color thereof cannot accurately measured. In addition, the initialization process hinders reduction of a time necessary for measuring the color.

SUMMARY

An advantage of some aspects of the invention is to provide a technology for realizing an accurate color measurement in short time in a configuration using a color measurement portion which needs an initialization process before measuring a color of one of patches while measuring the color using reflected light by applying a spot of light.

A color measurement apparatus of an aspect of the invention includes a color measurement portion that applies a spot of light to the color chart in which a plurality of patches are arranged in one direction, and measures a color of each of the plurality of patches using reflected light from the spot, a carriage that includes the color measurement portion mounted thereon, and a relative movement portion that relatively moves in one direction the carriage with respect to the color chart, in which the color measurement portion starts the color measurement after a predetermined initialization process, a predetermined moving section between patches overlaps an initialization section where the spot moves at the time of performing the initialization process, and the moving section between the patches is a section between a forward point having a distance as a radius of the spot with respect to the one direction and a backward point having a distance as a radius of the spot with respect to the one direction, based on a boundary of the patches.

According to the color measurement apparatus of the aspect, when the carriage is relatively moved with respect to the color chart, since the moving section between the patches, where the color measurement is not accurately performed due to mixed colors in the adjacent patches, overlaps the initialization section, where the color measurement cannot be performed, the color measurement can be accurately realized in a short time.

In the color measurement apparatus according to the aspect, one of the moving section between the patches and the initialization section preferably includes the other thereof.

According to the color measurement apparatus of the aspect, the color measurement portion may include a wavelength variable interference filter which controls a gap between reflection films facing to each other from a first value to a second value, and the initialization process may be a process in which the gap is controlled as the first value and is converged within a threshold.

Here, when the color measurement portion includes the wavelength variable interference filter, and the wavelength of the light emitted by the wavelength variable interference filter using the gap between reflection films is selected, there is a case in which a time for stabilizing the gap is required immediately after controlling the gap as a first value of an initial value. A time necessary for controlling and stabilizing the gap is allocated to a time necessary for the initialization process, thereby making it possible to improve an accuracy of the color measurement.

Moreover, the invention is not limited to the color measurement apparatus, and can be realized as various aspects, for example, it can be considered as a printing apparatus that forms the color chart, in addition to the color measurement.

BRIEF DESCRIPTION OF THE DRAWINGS

The invention will be described with reference to the accompanying drawings, wherein like numbers reference like elements.

FIG. 2 is a view illustrating a configuration of a color measurement portion in the printing apparatus.

FIG. 3 is a view illustrating a configuration of an optical filter device in the color measurement portion.

DESCRIPTION OF EXEMPLARY EMBODIMENTS

Hereinafter, the embodiment of the invention will be described with reference to drawings.

Figure 1:
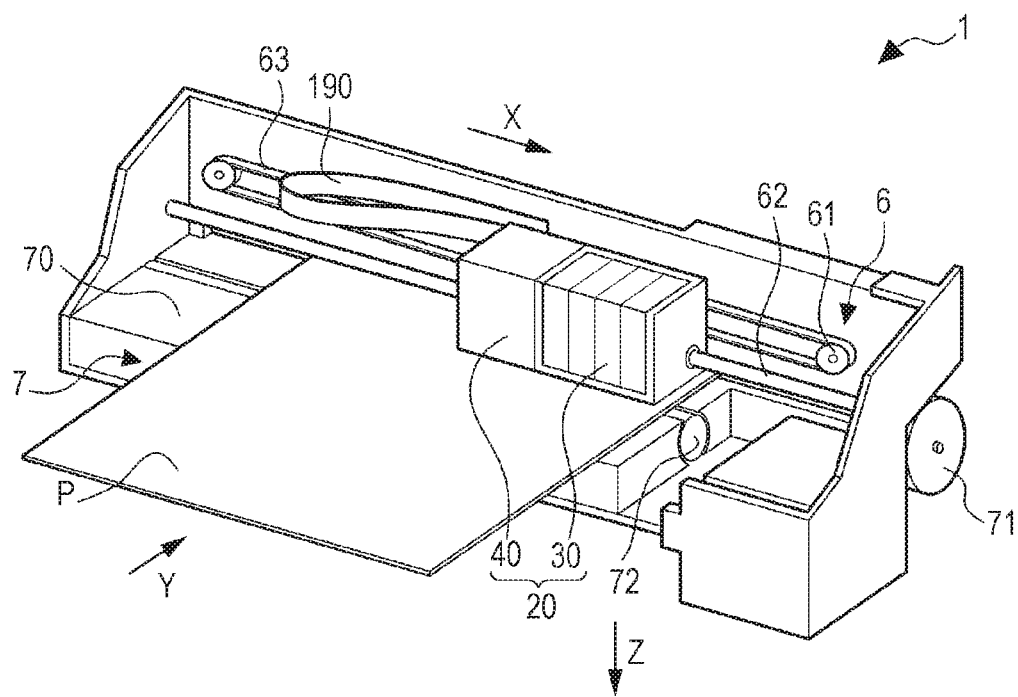
FIG. 1 is a view illustrating a schematic configuration of a printing apparatus according to an embodiment.

FIG. 1 is a perspective view illustrating a schematic configuration of a printing apparatus.

As illustrated in FIG. 1, a printing apparatus 1 includes a moving mechanism 6 which moves (reciprocates) a carriage 20 in a main scanning direction (X direction, and first direction).

The moving mechanism 6 includes a carriage motor 61 which moves the carriage 20, a carriage guide shaft 62 in which both ends thereof are fixed, and a timing belt 63 which is substantially parallel to the carriage guide shaft 62 and is driven by the carriage motor 61.

The carriage 20 is reciprocatedly supported by the carriage guide shaft 62, and is fixed to a part of the timing belt 63. For this reason, when the timing belt 63 is forwardly and backwardly driven by the carriage motor 61, the carriage 20 is guided using the carriage guide shaft 62 and is reciprocated.

In the carriage 20, a discharging portion 30 and a color measurement portion 40 are mounted. The discharging portion 30 is a printing portion including multiple nozzles provided on a part thereof facing a medium P such as paper, which respectively eject ink in a Z direction. In addition, the discharging portion 30 is schematically divided into four blocks for color printing. Each of the blocks respectively ejects black (Bk) ink, cyan (C) ink, magenta (M) ink, and yellow (Y) ink.

In addition, the color measurement portion 40 measures a color of an image (color chart) which is formed on the medium P by the discharging portion 30 as described later.

Also, in the carriage 20, a control signal is supplied to the discharging portion 30 or a driving signal supplied to the color measurement portion 40 from a main substrate (not illustrated) through the flexible cable 190, and a detecting signal from the color measurement portion 40 is supplied to the main substrate.

The printing apparatus 1 includes a transporting mechanism 7 which transports the medium P on a platen 70. The transporting mechanism 7 includes a transporting motor 71, which is a driving source, and a transporting roller 72 which transports the medium P in a sub scanning direction (Y direction, and second direction) using the transporting motor 71.

In such a configuration, the medium P is repeatedly transported by the transporting mechanism 7 while the nozzles of the discharging portion 30 eject the ink in accordance with print data according to main-scanning of the carriage 20, and thus an image (including letters, figures, color charts, and the like) is formed a surface of the medium P.

In addition, the printing apparatus 1 includes a color measurement function for measuring a color in a color chart which is formed on the medium P in accordance with predetermined data. The color measurement function is, for example, used for a calibration in which a color displayed using data of the measured color becomes a color defined by predetermined print data described above, or used for making a color profile.

The color chart is a color chart in which multiple colors patches as described later are printed in a matrix shape onto the medium P. The color measurement is performed by transporting the medium P, on which the color chart is formed, in the Y direction while a color measurement portion 40 mounted on the carriage 20 is forwardly and backwardly moved in a X direction.

FIG. 2 is a view illustrating a configuration of the color measurement portion 40, and particularly, illustrating an example of an optical path.

As illustrated in FIG. 2, the color measurement portion 40 is configured to have a light source 410, a condenser lens 412, a reflection mirror 414, a bandpass filter 416, an optical filter device 420, and a light receiving portion 430, and these are provided in a rectangular shape of a case 401 in an internal cavity.

In the case 401, an opening portion 418 is provided on a surface 402 facing the medium P.

The light source 410 is, for example, a white LED, and emits light so to be distributed over a wavelength region, which is at least a target to be measured. The condenser lens 412 emits the light which is emitted from the light source 410, as light beams substantially parallel to each other.

The light emitted from the condenser lens 412 passes through the opening portion 418, and is applied as a spot having a diameter D(m) onto the medium P facing the surface 402.

The reflection mirror 414 is a concave surface mirror which reflects and collects the light, which is reflected to the medium P and is passed through the opening portion 418, to the optical filter device 420 and the light receiving portion 430. The bandpass filter 416 shields harmful light except the wavelength having colors which are targets to be measured among the light beams which are reflected from the reflection mirror 414 and incident to the optical filter device 420.

The optical filter device 420 includes two variable reflection films including a gap therebetween, and transmits light having a specific wavelength out of light beams passing through the bandpass filter 416 by reflecting and interfering of the reflection films. The gap between the two reflection films in the optical filter device 420 is controlled by a voltage of the driving signal supplied through, for example, the flexible cable 190.

Although the light receiving portion 430 is not particularly illustrated, it includes a photodiode which converts the light having the specific wavelength passing through the optical filter device 420 into current, and a conversion circuit which converts the current due to the photodiode into the voltage.

FIG. 3 is a view illustrating a configuration of the optical filter device 420.

As illustrated in FIG. 3, the optical filter device 420 includes a housing 601 and a wavelength variable interference filter 5.

Among these, the housing 601 includes a base substrate 610 and a lid 620 for sealing which constitutes an internal space between the lid 620 and the base substrate 610.

In the base substrate 610, a light passage hole 611 corresponding to a circular light transmission region when viewed from the top in a Z direction is provided, and a cover glass 630 having a diameter larger than the light passage hole 611 is mounted on a surface opposite the lid 620. In the same manner, in the lid 620, a light passage hole 621 corresponding to the light transmission region is provided, and a cover glass 640 having a diameter larger than the light passage hole 621 is mounted on a surface opposite the base substrate 610.

The wavelength variable interference filter 5 includes a substrate 51 fixed by a holding member 58 with respect to the lid 620, and a substrate 52 bonded to the substrate 51.

The substrates 51 and 52 are made of glass, or the like, and have light transmissive properties. In a surface facing the substrate 52 in the substrate 51, a reflection film 53 includes the center of a light transmissive region, and is provided in a circular shape when viewed from the top. Meanwhile, on the surface facing the substrate 51 in the substrate 52, the reflection film 54 is provided to face the reflection film 53 and to maintain the gap. Moreover, in order to increase the reflectivity of the reflection films 53 and 54, silver, an alloy which includes silver as a main component, or the like, is used for these films.

In the optical filter device 420, the light incident from the cover glass 640 side is repeatedly reflected between the reflection films 53 and 54, light having a wavelength, which is as great as an integer times a distance corresponding to twice the gap, is applied to the cover glass 630 side.

In the optical filter device 420, a diaphragm 522 is provided on a surface opposite a surface facing the substrate 51 so as to face an outer circumferential edge of the light passage hole 611, outside a region on which the reflection film 54 is provided in the substrate 52 when viewed from the top.

In the substrate 52, in the surface facing the substrate 51, ring shaped electrodes 564 when viewed from the top are formed on an inner side between the diaphragm 522 and outside the reflection film 54. In the substrate 51, an electrode 563 having the same ring shape as the electrode 564 is formed on the surface facing the substrate 52 so as to face the electrode 564.

In the substrate 52, the diaphragm 522 is easily bent compared to other parts, when a driving signal is applied to the electrodes 563 and 564, an electrostatic attraction force is generated in accordance with a potential difference between the electrodes 563 and 564. For this reason, a region inside the diaphragm 522 is adjacent to the substrate 51 side, and the gap between the reflection films and 54 decreases in accordance with the potential difference. Meanwhile, when a driving signal is stopped to apply to the electrodes 563 and 564, the gap between the reflection films 53 and 54 returns to a former state.

For this reason, in the optical filter device 420, the gap between the reflection films 53 and 54 can be controlled using a voltage of the driving signal applied to the electrodes 563 and 564, the wavelength of the light, which is emitted from the cover glass 630, out of the light beams emitted from the cover glass 640, can be selected.

While the voltage of the driving signal applied to the optical filter device 420 is changed, that is, while the wavelength of the light extracted from the wavelength variable interference filter 5 is changed, a voltage output from the light receiving portion 430 is obtained, and thus a light intensity distribution with respect to a wavelength is obtained. In other words, disperses a plurality of wavelengths of the light in chronological order, and a spectrum intensity thereof is detected. In addition, the spectrum intensity is detected by one light receiving portion 430, and the influence of a deviation between the light receiving portions can be ignored compared to a configuration in which the spectrum intensity having different wavelength of multiple light receiving portions is detected.

Figure 4A:
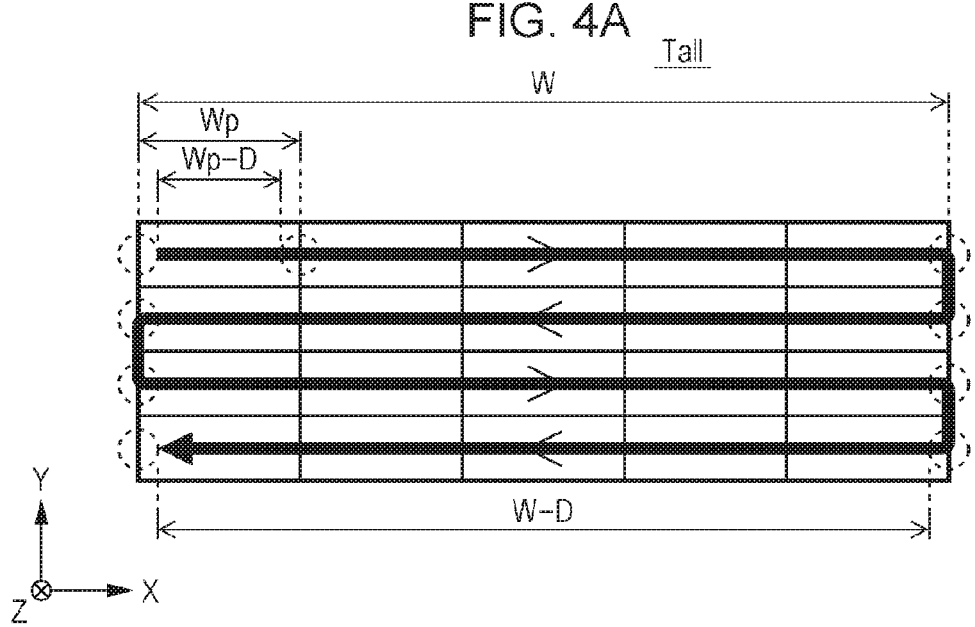
FIGS. 4A to 4C are diagrams illustrating a color measurement passage of a color chart using the color measurement portion.
Figure 4B:
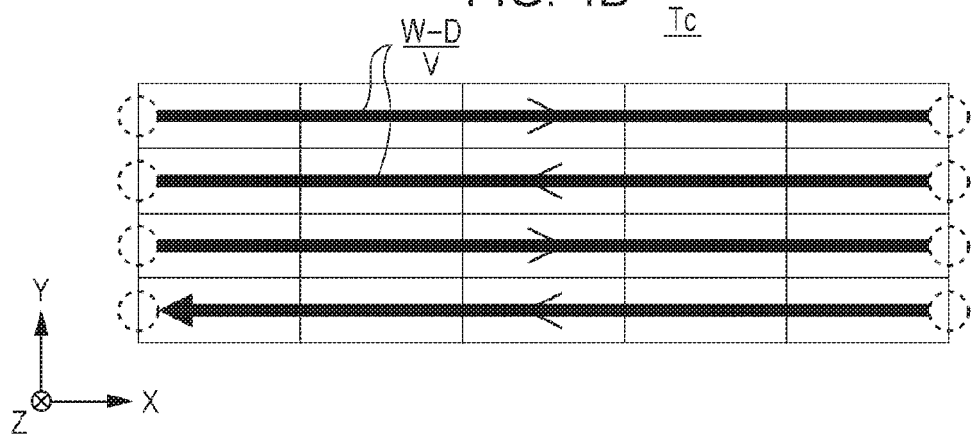
Figure 4C:
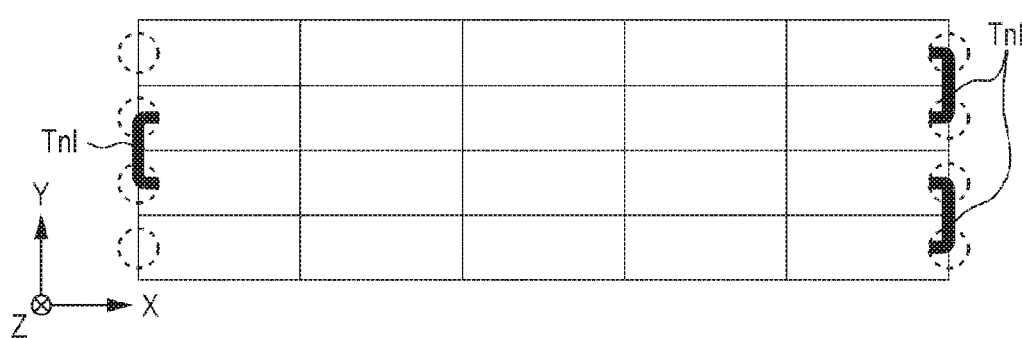

FIGS. 4A to 4C are diagrams for describing the color chart formed on the medium P, and color measurement passages of the color chart.

As illustrated in FIG. 4A, the discharging portion 30 ejects the ink so that the patches having multiple colors different from each other are arranged in a matrix shape onto the medium P, and thus the color chart is formed thereon. Here, a distance (width) of the color chart in the X direction which is a scanning direction of the carriage is set to W (m), and a width of the one color patch is set to Wp (m).

As described above, a spot of the light, which is emitted from the color measurement portion 40 and applied to the medium P, has a diameter D. When the spot is applied to a boundary of the patch, the spot is applied to both sides of the adjacent patches, and thus the color thereof cannot be accurately measured. In the same manner, when the spot is applied to an end portion of the color chart, the spot is applied to the patch and a medium P on which the color chart is not formed, and thus the color thereof cannot be accurately measured.

For details, when the center of the spot is applied in a range from one end toward a negative side of the X direction to a point where only a radius D/2 of the spot is away from a positive side of the X direction in any patch, and a range from the other end toward the positive side of the X direction to a point where only the D/2 of the spot is away from the negative side of the X direction, a color of the patch cannot be accurately measured.

In other words, when the center of the spot in the patch is applied to a point other than these ranges, the color of the patch can be accurately measured. A distance where the color of the patch can be measured, is (Wp−D) which is a subtraction of the diameter D of the spot from a width Wp of the patch. The wavelength of the light passing through the wavelength variable interference filter 5 needs to be changed using the voltage of the driving signal in a period where the center of the spot moves the distance (Wp−D) in the X direction by the carriage 20.

Here, for the sake of convenience, time for measuring the color of one patch by the color measurement portion 40 is set to Tm (seconds). In this example, when the time Tm is set to time when the center of the spot moves the distance (Wp−D), a movement velocity V of the carriage (spot) can be expressed as Expression (1) described below.

$$V=(Wp-D)/Tm \qquad (1)$$

Next, regarding an arrangement of the patches in the color chart, an arrangement in the X direction is considered as a "column", and an arrangement in the Y direction is considered as a "row". The number of the columns Nc of the patch constituting one row can be generally expressed as Expression (2) described below.

$$Nc=W/Wp \qquad (2)$$

Moreover, FIGS. 4A to 4C are examples in which the number of the patches in a column is "five".

In addition, when a total number (the number of colors) of the patches constituting the color chart is set to Nall, a row number L of the color chart can be generally expressed using a value obtained when dividing the total number Nall by the number of the columns Nc, that is, can be expressed as Expression (3) described below.

$$L=Nall/Nc \qquad (3)$$

When Nc of Expression (2) is substituted for NC of Expression (3), Expression (3) can be expressed as Expression (4) described below.

$$L=(Nall \cdot Wp)/W \qquad (4)$$

Moreover, FIGS. 4A to 4C are examples in which the number of the rows L of the color chart is "4".

In order to measure the colors of all patches of such a color chart, the medium P is necessary to be transported in the Y direction while the carriage 20 is positively or negatively moved in the X direction so that the spot of the light emitted from the color measurement portion 40 moves along a passage illustrated by a straight thick line in FIG. 4A.

Such a passage can be divided into L numbers of the passage necessary for moving the carriage 20 as illustrated in FIG. 4B, and (L−1) numbers of the passage in response to transporting of the medium P by the transporting mechanism 7 as illustrated in FIG. 4C.

Here, it is considered that time Tall (seconds) necessary for measuring the colors of all patches in the color chart is reduced. The time Tall can be expressed by adding the time Tc (seconds) necessary for following the passage illustrated in FIG. 4B to the time Td (seconds) necessary for following the passage illustrated in FIG. 4C. That is, the time Tall can be expressed as Expression (5).

$$Tall=Tc+Td \quad (5)$$

First, the time Tc is expressed as L (rows number) times of a time which is taken for moving the carriage 20 the distance (W−D) at a velocity V. Therefore, the time Tc can be expressed as Expression (6) described below.

$$Tc=L(W-D)/V \quad (6)$$

When Expression (6) is expressed as Expression (7) described below using Expression (1) and Expression (4).

$$Tc=(Nall \cdot Wp \cdot Tm)(W-D)/\{W(Wp-D)\} \quad (7)$$

Next, the time Td is (L−1) times of time Tnl for transporting the medium P a distance of one row in the Y direction when the carriage 20 reaches one end of the color chart. Therefore, the time Td can be described as Expression (8) described below.

$$Td=Tnl(L-1) \quad (8)$$

When L of Expression (4) is substituted for L of Expression (8), Expression (8) can be described as Expression (9) described below.

$$Td=Tnl\{(Nall \cdot Wp/W)-1\} \quad (9)$$

However, the time Tall in Expression (5) can be described as Expression (10) described below using Expression (7) and Expression (9).

$$Tall=(Nall \cdot Wp \cdot Tm)(W-D)/\{W(Wp-D)\}+Tnl\{(Nall \cdot Wp/W)-1\} \quad (10)$$

Figure 5:
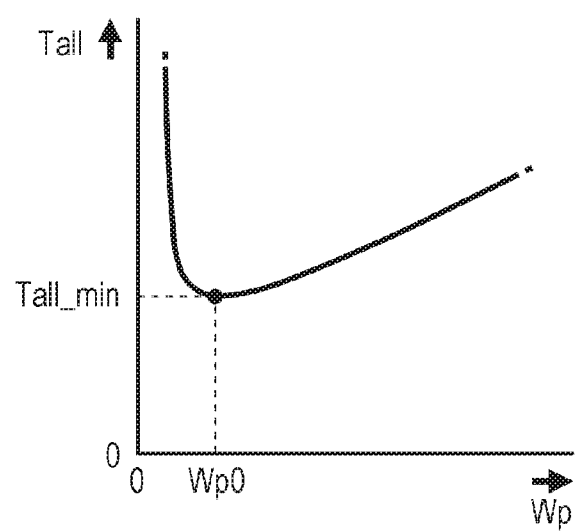
FIG. 5 is a diagram illustrating characteristics of a function of the entire time for color measurement in which a width of a patch is set to an argument.

Here, in a case in which the time Tall has the width Wp of the patch as argument, and the other value is considered as a constant function, the function is described to protrude from the bottom as illustrated in FIG. 5, and is expressed as a minimum value Tall_min when the width Wp is Wp0. The value Wp0 at this time is described as Expression (11) described below.

$$Wp0=D+\{(D \cdot Tm/Tnl) \cdot (W-D)\}^{1/2} \quad (11)$$

Therefore, the width Wp of the patch constituting the color chart is optimized as Wp0 expressed using Expression (11), and thus the measurement time of the color in the color chart can be minimized.

As characteristics illustrated in FIG. 5, the function is rapidly increased in a negative side (left side) of the minimum value Tall_min, but is slowly increased in a positive side (right side) relatively. In other words, when the width Wp is even slightly smaller than the value Wp0, the time Tall is greatly increased with respect to the minimum value Tall_min; however, even when the width Wp is slightly greater than the value Wp0, the time Tall is slightly increased with respect to the minimum value Tall_min.

In order to minimize the time Tall necessary for measuring the color of all patches in the color chart, the width Wp of the patch in the color chart may be set to the value Wp0; however, even when the width W is slightly greater than the value Wp0, a slight increase of the time Tall can be allowable. Specifically, an increase in the time Tall can be acceptable as long as the width W is approximately the value Wp0+10% or smaller.

Figure 6A:
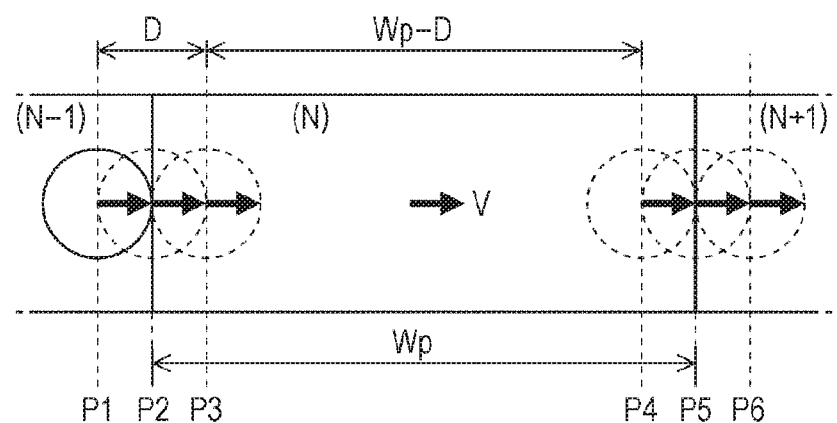
FIGS. 6A and 6B are diagrams illustrating an operation of the optical filter device, and the like at the time of measuring a color of the patch.

FIG. 6A is a diagram illustrating an aspect of the movement of the spot of the light, which is emitted from the color measurement portion 40 to the medium P when the color of the patch is measured. Also, FIG. 6A illustrates the aspect in which the spot moves in order of the patches (N−1), N, and (N+1). In addition, regarding a position of the spot, the center of the spot will be described for the sake of convenience.

As described above, when a part of the spot is applied to a boundary of the patch, for details, when the position (center) of the spot is within a range to be described below in FIG. 6A, the color cannot be accurately measured. That is, the range is a range from a forward point P1 to a backward point P3 in a transportation direction as a radius D/2 of the spot based on a point P2 which is a boundary between the patch (N−1) and the patch N, and a range from a forward point P4 to a backward point P6 in a transportation direction of as the radius D/2 of the spot based on a point P5 which is a boundary between the patch (N+1) and the patch N. Moreover, there is a case in which a range from a forward point to the rearward point as the radius of the spot based on the boundary of the patch is set to a moving section between the patches (or time). In addition, a distance of the moving section between the patches described above is a diameter D of the spot, and movement time between the patches is D/V.

In other words, regarding the patch N, it means that the color of the patch N can be accurately measured when a position of the spot is within a range from the point P3 to the point P4. Also, a distance from the point P3 to the point P4 is (Wp−D) as described above.

Figure 6B:
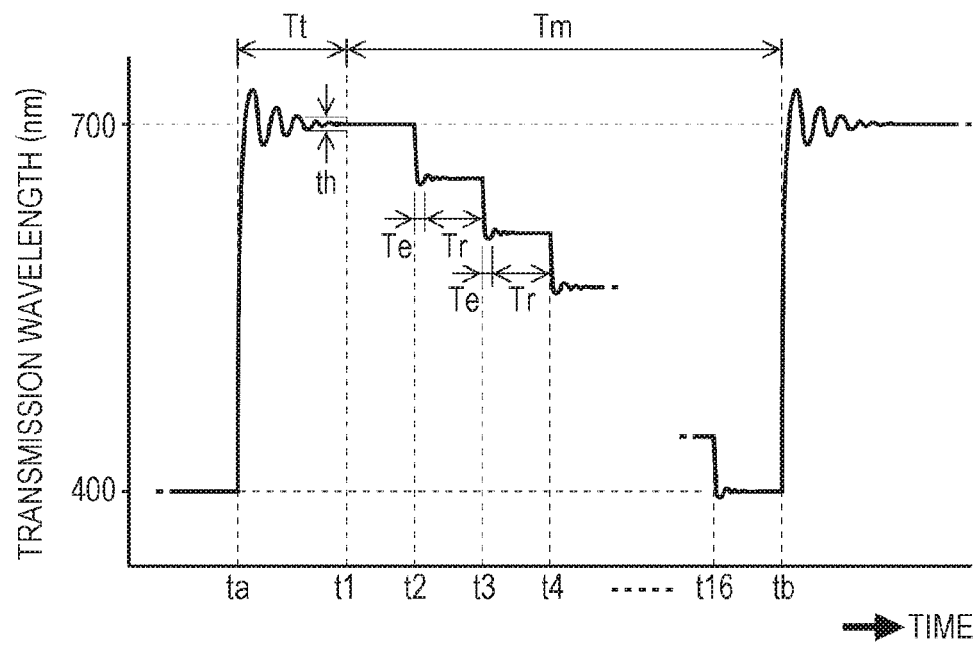

FIG. 6B is a diagram illustrating a movement of the spot corresponding to a change of the wavelength of the light which transmits the wavelength variable interference filter 5 in the optical filter device 420. In the optical filter device 420, when one color of the patch is measured, the wavelength of the light (transmitted light wavelength) emitted from the wavelength variable interference filter 5 is sequentially controlled through 16 stages, for example, from 700 nm (first value) to 400 nm (second value), and the light receiving portion 430 receives the transmitted light from the wavelength variable interference filter 5 at this time. Specifically, the driving signal applied to the wavelength variable interference filter 5 is changed by the voltage corresponding to the transmitted light wavelength, and thus the gap between the reflection films 53 and 54 is controlled in stages from a maximum value corresponding to the transmitted light wavelength of 700 nm to a minimum value corresponding to the transmitted light wavelength of 400 nm, therefore, the light receiving portion 430 detects the intensity (spectrum intensity) of the transmitted light of the wavelength variable interference filter 5 in each stage.

The time t1 to the time t2 illustrated in FIG. 6B is time for detecting the spectrum intensity the transmitted light wavelength of 700 nm. The time t2 to the time t3 is time for detecting the spectrum intensity of the wavelength reduced as the transmitted light wavelength in a first stage from 700 nm. The time t3 to the time t4 is time for detecting the spectrum intensity of the wavelength reduced as the transmitted light wavelength in a second stage from 700 nm. After that, in the same manner, the time t16 to the time tb is a time for detecting the spectrum intensity of 400 nm of the transmitted light wavelength which is reduced in 16th stages from 700 nm.

Also, in this example, the time Tm necessary for measuring the color of one patch using the color measurement portion 40 can be generally expressed as Expression (12)

described below from a point of view of controlling the wavelength variable interference filter 5.

$$Tm = Te(Q-1) + Tr \cdot Q \qquad (12)$$

In Expression (12), Q indicates the number of stages when the gap is controlled, that is, the number of wavelengths being measured, and is "16" in the example of the drawing. Te indicates an average time (seconds) necessary for controlling the gap corresponding to the wavelength in the stage to be a target until stabilized. Moreover, since a changed amount of the gap is different in each stage, the time Te is set to an average value. In addition, regarding the initial 700 nm, the gap after the initialization period elapsed is used as it is, and a time when the gap corresponding to the wavelength of 700 nm is controlled until stabilized is zero.

Meanwhile, in the optical filter device 420, the transmitted light wavelength is changed to 400 nm, and the intensity of the light of the wavelength is output from the light receiving portion 430, and then an initialization process for controlling (initializing) the value of the gap is performed so that the transmitted light wavelength becomes 700 nm with respect to measuring the color of next patch.

Initializing the transmitted light wavelength as 700 nm means that the gap is returned from the minimum value to the maximum value (so called returning driving), and a changed amount of the gap is great. For this reason, at the time of returning driving, as illustrated in the drawing, the transmitted light wavelength is taken long time until becomes stabilized and converged. For details, for example, at the time ta (tb), even when the gap is controlled from a value when the transmitted light wavelength corresponds to 400 nm to the initial value when the transmitted light wavelength corresponds to 700 nm, the transmitted light wavelength is not immediately stabilized to 700 nm, and it takes some time for converging the transmitted light wavelength within the threshold th with respect to 700 nm. Also, time from the time ta when the gap is controlled to the initial value corresponding to 700 nm of the transmitted light wavelength to time when an actual transmitted light wavelength is converged within the threshold th with respect to 700 nm, is referred to as an initialization period, and a section where the spot moves in the initialization period is referred to as an initialization section. In the drawings, the initialization period for measuring the color of the patch N is expressed using Tt between the time ta to the time t1.

In the initialization period, the transmitted light wavelength of the wavelength variable interference filter 5 is changed so as not to be stabilized, whereby it is not appropriate to measure the color of the patch.

In the embodiment, since the moving section between the patches (for example, point P1 to point P3) where the spot is applied to both sides of the adjacent patches and cannot be accurately measured the color, and coincides with the initialization period Tt which is not appropriated to measure the color so as not to stabilize the transmitted light wavelength from the wavelength variable interference filter 5, the movement of the spot with respect to the patch in the color chart is controlled at a suitable timing by the wavelength variable interference filter 5 in the optical filter device 420. For this reason, in the embodiment, a delay due to returning driving is suppressed to be minimized, and thus it is considered that the time taken for measuring the color can be reduced by securing accuracy of the color measurement.

In addition, in the embodiment, there is an example in which D indicating a distance between the moving section between the patches (point P1 to point P3) coincides with the initialization section where the spot moves to the initialization period Tt; however, one of these may be partially overlapped with the other.

FIGS. 7A to 7E are diagrams illustrating an example of a relationship in which the moving section between the patches and the initialization section are partially overlapped with each other.

Figure 7A:
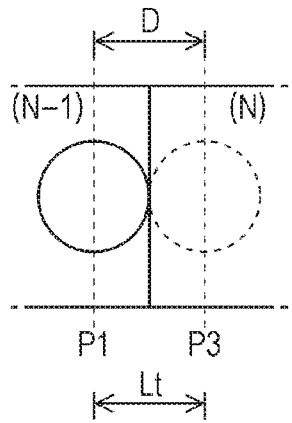
FIGS. 7A to 7E are diagrams illustrating a relationship between a moving section between patches and an initialization section.

First, FIG. 7A illustrates an example in which the moving section between the patches (point P1 to point P3) coincides with the initialization section Lt.

Figure 7B:
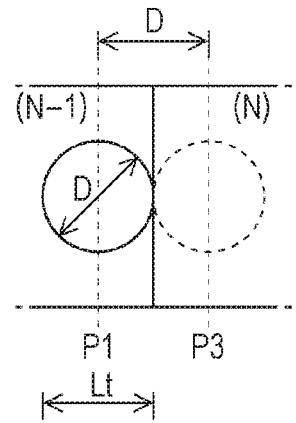

FIG. 7B illustrates an example in which the initialization section Lt is preceded before the moving section between the patches. In this case, since the initialization process starts before the center of the spot is applied to the moving section between the patches, by that amount, compared to a case of FIG. 7A, the distance (Wp−D) which can be used for measuring the color of the patch is eroded.

Figure 7C:
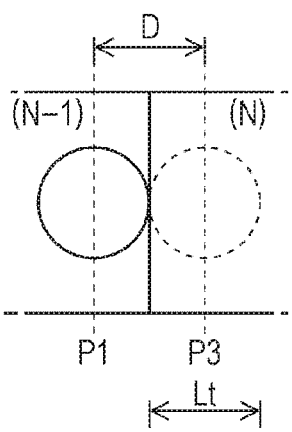

Reversely, FIG. 7C exemplifies a case in which the initialization section Lt is preceded next to the moving section between the patches. In this case, even when the center of the spot is deviated from the moving section between the patches, the initialization process continues.

Figure 7D:
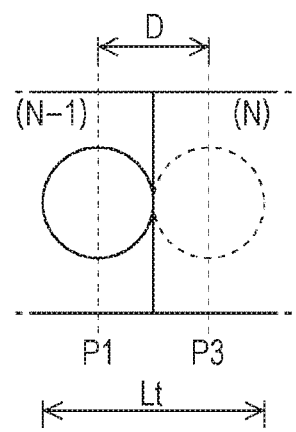
Figure 7E:
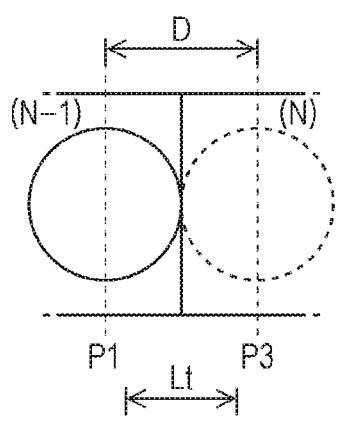

FIG. 7D exemplifies a case in which the moving section between the patches is included in the initialization section Lt, and a case when the initialization section Lt is taken long with respect to the diameter D of the spot (when time is needed for initialization process). Reversely, FIG. 7E illustrates an example in which the initialization section Lt is included in the moving section between the patches, and the initialization section is reduced with respect to the diameter D of the spot.

In addition, in the embodiment, regarding the wavelength variable interference filter 5, the transmitted light wavelength is changed to be reduced from 700 nm to 400 nm; however, reversely, the transmitted light wavelength is changed to be increased from 400 nm to 700 nm, that is, the gap may be changed in stages from being narrowed to widened.

The initialization process of this configuration means a process in which the gap is controlled as a value corresponding to 400 nm of the transmitted light wavelength.

In the embodiment, in a first row of the color chart, the color is measured by moving the carriage 20 in the X direction with respect to the medium P; however, a first row of the color chart is set to the Y direction, the carriage 20 is fixed, and the color may be measured by transporting the medium P in the Y direction, on which the color chart is formed. The point is that, at the time of measuring the color, the carriage 20 and the color chart may be relatively moved in a direction where the first row of the patch is arranged.

Figure 8:
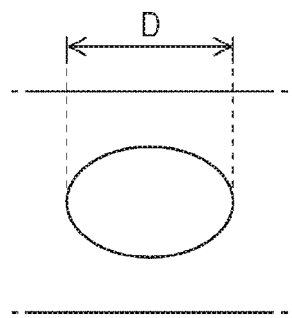
FIG. 8 is a diagram for describing a diameter of a spot.

In the embodiment, the spot of the light being applied to the color chart is described as a circular shape; however, the spot may not be a circular shape due to an aberration of the condenser lens 412, not being parallel of the surface 402 and the color chart to each other, or the like. Regarding the spot in a case of not circular shape, as illustrated in FIG. 8, the width of the spot in the X direction (movement direction of the carriage 20) may be considered as D.

The entire disclosure of Japanese Patent Application No. 2014-258513 filed on Dec. 22, 2014 is expressly incorporated by reference herein.

What is claimed is:

1. A color measurement apparatus comprising:
   a color measurement member including:
     a light source configured to emit a spot light having various wavelengths to a color chart in which a plurality of patches are consecutively arranged in a continuous array in one direction, the spot light having a light radius, the plurality of patches having different colors from each other, the plurality of patches being delineated from each other by boundaries;
a wavelength variable filter positioned to receive a reflected light which is generated by reflecting the spot light from the color chart, the wavelength variable filter being configured to pass filtered light having one of the various wavelengths, the wavelength variable filter having first and second reflection films facing each other via a gap; and
a light detector configured to detect the filtered light from the wavelength variable filter so as to measure a color of each of the plurality of patches based on a measurement wavelength of the reflected light;
a carriage on which the color measurement member is mounted; and
a relative movement mechanism that relatively moves the carriage in the one direction with respect to the color chart,
wherein the color measurement member starts color measurement after an initialization process which is configured to initialize the measurement wavelength, and in the initialization process, the gap between the first and second reflection films is set to a reference distance over a first period of time, and
wherein the initialization process is performed while the carriage moves from a first position relative to one of the boundaries to a second position relative to the one of the boundaries in the one direction, the first position is spaced upstream of the one of the boundaries by a distance equal to the light radius in the one direction, and the second position is spaced downstream of the one of the boundaries by the distance equal to the light radius in the one direction.

2. The color measurement apparatus according to claim 1, wherein when the carriage moves from the first position to the second position, a second period of time passes, and
the first period of time is different from the second period of time.

3. The color measurement apparatus according to claim 1, wherein the reference distance of the gap in the initialization process is within a range of a threshold value.

4. A printing apparatus comprising:
a printing member that is configured to print a color chart in which a plurality of patches are consecutively arranged in a continuous array in one direction, the plurality of patches being delineated from each other by boundaries, the plurality of patches having different colors from each other;
a color measurement member including:
  a light source configured to emit a spot light having various wavelengths to the color chart, the spot light having a light radius;
  a wavelength variable filter positioned to receive a reflected light which is generated by reflecting the spot light from the color chart, the wavelength variable filter being configured to pass filtered light having one of the various wavelengths, the wavelength variable filter having first and second reflection films facing each other via a gap; and
  a light detector configured to detect the filtered light from the wavelength variable filter so as to measure a color of each of the plurality of patches based on a measurement wavelength of the reflected light;
a carriage on which the color measurement member is mounted; and
a relative movement mechanism that relatively moves the carriage in the one direction with respect to the color chart,
wherein the color measurement member starts color measurement after an initialization process which is configured to initialize the measurement wavelength, and in the initialization process, the gap between the first and second reflection films is set to a reference distance over a first period of time, and
wherein the initialization process is performed while the carriage moves from a first position relative to one of the boundaries to a second position relative to the one of the boundaries in the one direction, the first position is spaced upstream of the one of the boundaries by a distance equal to the light radius in the one direction, and the second position is spaced downstream of the one of the boundaries by the distance equal to the light radius in the one direction.

5. A color measurement apparatus comprising:
a color measurement member including:
  a light source configured to emit a soot light having various wavelength to a color chart in which a plurality of patches are consecutively arranged in a continuous array in one direction, the plurality of patches being delineated from each other by boundaries, the spot light having a light radius, and the plurality of patches having different colors from each other; and
  a wavelength variable filter positioned to receive a reflected light which is generated by reflecting the spot light from the color chart, the wavelength variable filter being configured to pass filtered light having one of the various wavelengths, the wavelength variable filter having first and second reflection films facing each other via a gap; and
a relative movement mechanism that relatively moves the color measurement member in the one direction with respect to the color chart,
wherein the color measurement member is configured to measure a color of each of the plurality of patches based on a measurement wavelength of the reflected light after an initialization process which is configured to initialize the measurement wavelength, and in the initialization process, the gap between the first and second reflection films is set to a reference distance over a first period of time, and
the initialization process is performed while the color measurement member moves from a first position relative to one of the boundaries to a second position relative to the one of the boundaries in the one direction, the first position is spaced upstream of the one of the boundaries by a distance equal to the light radius in the one direction, and the second position is spaced downstream of the one of the boundaries by the distance equal to the light radius in the one direction.

6. A printing apparatus comprising:
a printing member that is configured to print the color chart; and
the color measurement apparatus according to claim 5.

* * * * *